(12) United States Patent
Kwak et al.

(10) Patent No.: US 10,712,560 B2
(45) Date of Patent: Jul. 14, 2020

(54) HEAD-UP DISPLAY DEVICE FOR VEHICLE AND CONTROL METHOD OF HEAD-UP DISPLAY FOR VEHICLE

(71) Applicants: HYUNDAI MOTOR COMPANY, Seoul (KR); KIA MOTORS CORPORATION, Seoul (KR)

(72) Inventors: Hee Chon Kwak, Seoul (KR); Kyung Ro Lee, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 202 days.

(21) Appl. No.: 15/624,359

(22) Filed: Jun. 15, 2017

(65) Prior Publication Data

US 2018/0364479 A1    Dec. 20, 2018

(30) Foreign Application Priority Data

Mar. 7, 2017    (KR) .................. 10-2017-0028975

(51) Int. Cl.
*G02B 27/01*    (2006.01)
*B60K 35/00*    (2006.01)

(52) U.S. Cl.
CPC .......... *G02B 27/0149* (2013.01); *B60K 35/00* (2013.01); *G02B 27/0101* (2013.01); *B60K 2370/155* (2019.05); *B60K 2370/1529* (2019.05); *B60K 2370/21* (2019.05); *B60K 2370/23* (2019.05); *B60K 2370/31* (2019.05); *B60K 2370/52* (2019.05); *B60K 2370/66* (2019.05); *B60K 2370/67* (2019.05); *G02B 2027/0159* (2013.01)

(58) Field of Classification Search
CPC .... B60K 2350/1072; B60K 2350/2013; B60K 2350/2065; B60K 2350/352; B60K 35/00; G02B 2027/0159; G02B 2027/0101; G02B 2027/0149
See application file for complete search history.

(56) References Cited

U.S. PATENT DOCUMENTS 8,427,751 B2    4/2013  Rumpf et al.
8,953,247 B2    2/2015  Rumpf et al.
(Continued)

FOREIGN PATENT DOCUMENTS

JP    2006-011122 A    1/2006
JP    2014-058299 A    4/2014

*Primary Examiner* — Joseph P Martinez
(74) *Attorney, Agent, or Firm* — Morgan, Lewis & Bockius LLP

(57) ABSTRACT

A head-up display device for a vehicle includes a housing including a guide plate forming first and second surfaces thereof, the housing mounted on a dashboard of a vehicle, a display disposed in the housing for generating an image, a mirror disposed opposite from the display for reflecting the image provided by the display, a combiner device including a combiner for providing the image reflected from the mirror to a driver, and for moving vertically in opposed first and second directions relative to the housing, a shutter device including a shutter disposed on an upper portion of the housing for opening and closing the combiner in a sliding manner, and an operation device disposed in the housing for engaging a sliding movement of the shutter with a movement of the combiner device.

14 Claims, 14 Drawing Sheets

(56) References Cited

U.S. PATENT DOCUMENTS

| | | | |
|---|---|---|---|
| 9,857,587 B2* | 1/2018 | Chien | G02B 27/0149 |
| 2010/0046082 A1* | 2/2010 | Croy | B60K 35/00 |
| | | | 359/632 |
| 2013/0100535 A1 | 4/2013 | Ruyten | |

* cited by examiner

… … …

HEAD-UP DISPLAY DEVICE FOR VEHICLE AND CONTROL METHOD OF HEAD-UP DISPLAY FOR VEHICLE

CROSS-REFERENCE TO RELATED APPLICATION

This application claims the benefit of priority to Korean Patent Application No. 10-2017-0028975, filed on Mar. 7, 2017 with the Korean Intellectual Property Office, the entire disclosure of which is incorporated herein by reference.

TECHNICAL FIELD

Embodiments disclosed herein relate to a head-up display device for a vehicle and a control method thereof, including a combiner for providing an image and a shutter for protecting the combiner.

BACKGROUND

Generally, a driver operates a vehicle while checking vehicle information, such as the running speed of the vehicle, the rotating speed of an engine and the fuel amount displayed on an instrument panel. Since the instrument panel is located on a dashboard of the vehicle, the driver has to lower his or her head to check the vehicle information, and the driver's gaze may deviate from the front of the vehicle, leading to potentially adverse driving situations.

A head-up display (HUD) device for a vehicle has been developed as a device for aiding a driver's safety and convenience, and for effectively transmitting the vehicle information to the driver.

The HUD device for vehicle allows information of the instrument panel to be displayed on, or near, a front window glass in accordance with a height of the driver's eyes so that the driver may easily check the vehicle information.

Therefore, the driver may safely operate the vehicle by confirming the vehicle information without taking his or her eyes away the front of the vehicle while driving the vehicle.

The HUD device for vehicle may include a front window type HUD device to project an image to, or on, the front window glass and a combiner type HUD device to project an image to a separate combiner rather than the front window glass.

Unlike the front-window type HUD, the combiner-type HUD may include a shutter mounted at a front to protect the combiner and an operation device to drive the combiner and the shutter.

However, the combiner-type HUD does not cause inconvenience when driving-related information needs to be obtained from the combiner, but may disturb the driver in driving because the combiner in front of the driver distracts the driver's attention when there is no need for driving-related information.

Therefore, the position of the combiner needs to be adjusted such that the combiner is positioned in front of the driver only when the driving-related information is required. Also, the position of the combiner needs to be adjusted in consideration the driver's eye height by ascending/descending or pivoting to prevent a distortion of a virtual image displayed to the driver.

SUMMARY

The present disclosure provides an improved head-up display device for a vehicle which allows a combiner to move up and down from a housing and a shutter for protecting the combiner to in a sliding manner.

The present disclosure provides an improved head-up display device for a vehicle capable of engaging a sliding of a shutter with up and down movements of a combiner.

The present disclosure provides an improved head-up display device for a vehicle, which includes a fail-safe device to prepare for a failure due to an external force on a combiner and a shutter.

In accordance with an aspect of the present disclosure, a head-up display device for a vehicle includes a housing including a guide plate to form both surfaces thereof and mounted on a dashboard of a vehicle, a display disposed in the housing and configured to generate an image, a mirror disposed opposite to the display and configured to reflect the image provided by the display, a combiner device including a combiner configured to provide the image reflected from the mirror to a driver, and configured to move up and down from the housing, a shutter device including a shutter disposed on an upper portion of the housing to open and close the combiner in a sliding manner and an operation device disposed in the housing to engage a sliding movement of the shutter with an up and down movement of the combiner device.

The operation device may include a motor disposed to a side of the housing to drive the operation device, and a cam disposed to both side surfaces of the housing to interlock the combiner device with the shutter device by using the motor.

The operation device may include a shaft allowing the combiner device to be housed in the housing and configured to transmit a rotational force of the motor to an opposite side of the housing and a shaft gear connected to both ends of the shaft to be engaged with the cam so that the shaft gear moves in conjunction with the cam.

The combiner device may include a combiner holder configured to fix the combiner, and a combiner arm rotatably disposed on the guide plate and configured to move the combiner holder up and down.

The cam may include a combiner arm operating part configured to adjust the combiner arm so that the combiner arm rotates in conjunction with the rotation of the cam.

The combiner device may include a combiner holder link pin protruded from one end of the combiner arm, and a combiner holder link pin guide groove arranged on the guide plate to allow the combiner holder link pin to be inserted and guided.

The combiner device may include a combiner tilting pin configured to adjust an angle of the combiner withdrawn, while having the combiner holder link pin as an axis of rotation, and a combiner tilting pin adjusting part arranged in the cam to adjust the combiner tilting pin by a rotation of the cam.

The shutter device may include a shutter tooth part disposed at a lower portion of the shutter to allow the shutter to be slid, and a shutter gear engaged with the shutter tooth part to transmit the rotation of the cam to the shutter.

The shutter device may include a shutter moving pin configured to protrude from both sides of the shutter, and a shutter moving pin guide groove arranged on the guide plate to allow the shutter moving pin to be inserted and guided.

The cam may include a shutter moving pin trigger arranged in the cam and configured to adjust the shutter moving pin to prevent interference the up and down movement of the combiner and the sliding of the shutter that are engaged with each other.

The head-up display device for a vehicle may further include a fail-safe device configured in the housing to prepare for a failure of the head-up display device.

The fail-safe device may include a TACT which disposed near the cam to detect the withdrawn position and a zero point of angle of the combiner.

The fail-safe device may include a motor rotation detection sensor disposed adjacent to the motor to detect a rotation angle and speed of the motor.

In accordance with an aspect of the present disclosure, a method of controlling a head-up display device for a vehicle, the method includes driving a motor arranged in a guide plate that forms both sides of a housing, transmitting a rotation of the motor to an opposite side of the housing through a shaft arranged in the housing and a shaft gear connected to both ends of the shaft, rotating a cam disposed at each side of the housing through the shaft gear, sliding a shutter disposed on an upper portion of the housing by the rotation of the cam and moving up and down a combiner from the housing in conjunction with the sliding of the shutter.

The method may further include adjusting a shutter moving pin inserted and guided by a shutter moving pin guide groove arranged in the guide plate, by using a shutter moving pin trigger arranged in the cam that adjusts a timing of sliding of the shutter to prevent an interference between the up and down movement of the combiner and the sliding of the shutter which are engaged with each other.

The method may further include adjusting a combiner tilting pin configured to protrude from both sides of a combiner holder configured to accommodate the combiner, by using a combiner tilting pin adjusting part arranged in the cam to adjust an angle of the combiner withdrawn.

The method may further include preparing for a failure of the head-up display device by using a fail-safe device including a TACT switch disposed adjacent the cam to detect a withdrawn position and a zero point of an angle of the combiner and a motor rotation detection sensor disposed adjacent to the motor to detect a rotation angle and speed of the motor.

The preparing for the failure of the head-up display device may include preparing for a malfunction of the motor including forcibly stopping the rotation of the motor when the motor rotates in a forward direction by a predetermined amount or more to withdraw the housed combiner, and forcibly stopping the rotation of the motor when the motor rotates in a reverse direction by ma predetermined amount or more to house the withdrawn combiner.

The preparing for the failure of the head-up display device may include preparing for a case in which an external force is applied to the combiner and the shutter including stopping the rotation of the motor after the motor rotates in the reverse direction by a predetermined amount, when an external force is generated during the forward rotation of the motor to withdraw the housed combiner, and stopping the rotation of the motor after the motor rotates in the forward direction by a predetermined amount when an external force is generated during the reverse rotation of the motor to house the withdrawn combiner.

The present disclosure may adjust the height of the combiner and prevent a dust introduced into the combiner by moving up and down the combiner from the housing, and opening and closing the combiner by the sliding of the shutter to protect the combiner.

The present disclosure may simplify the operation of the head-up display device for a vehicle and improve the usability by interlocking the up and down movements of the combiner and the sliding of the shutter by the operation of the motor.

The present disclosure may assure a safety even when the head-up display device for a vehicle malfunctions by including a fail-safe device to prepare in case of a failure due to an external force on the combiner and the shutter.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations illustrated in the embodiments and the drawings described in the present specification are only the exemplary embodiments of the present disclosure, and thus it is to be understood that various modified examples, which may replace the embodiments and the drawings described in the present specification, are possible when filing the present application. Hereinafter, exemplary embodiments of the present disclosure are described in detail with reference to the accompanying drawings.

Figure 1:
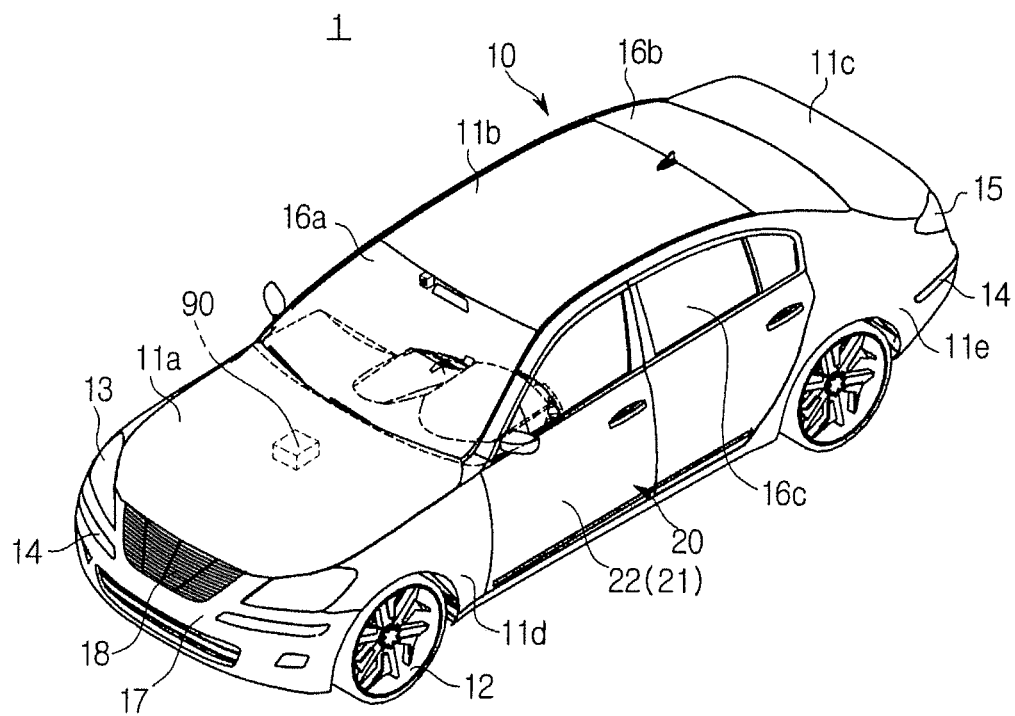
FIG. 1 is a view schematically showing an outer appearance of a vehicle including a head-up display device for a vehicle according to exemplary embodiments of the present disclosure.

FIG. 1 is a view schematically showing an outer appearance of a vehicle including a head-up display device for a vehicle according to exemplary embodiments of the present disclosure. As shown in FIG. 1, a vehicle 1 may include a vehicle body 10 forming an outer appearance of the vehicle 1 and a plurality of wheels 12 configured to move the vehicle 1.

The vehicle body 10 may include a hood 11a to protect various devices, such as an engine, required for driving the vehicle 1, a roof panel 11b forming the internal space of the vehicle 1, a trunk lid 11c to provide a storage space, and front fenders 11d and quarter panels 11e provided at both sides of the vehicle 1.

Also, a plurality of doors 20 hingedly attached to the vehicle body 10 may be provided at the sides of the vehicle 10. The door 20 may include a door panel 21 including a door outer panel 22 forming an outer appearance of the vehicle 1.

A front window 16a providing a view toward the front of the vehicle 1 may be provided between the hood 11a and the roof panel 11b, and a rear window 16b providing a view toward the back of the vehicle 1 may be provided between the roof panel 11b and the trunk lid 11c.

A plurality of side windows 16c providing a view toward the sides of the vehicle 1 may be provided at the upper parts of the doors 20.

A plurality of headlamps 13 for irradiating light in a heading or forward moving direction of the vehicle 1 may be provided at the front part of the vehicle 1. A plurality of turn signal lamps 14 for informing a movement direction of the vehicle 1 may be provided at the front and back parts of the vehicle 1.

The vehicle 1 may inform a movement direction of the vehicle 1 by flicking the turn signal lamps 14. A plurality of tail lamps 15 may be provided at the back part of the vehicle 1 to inform a gear shifting state, a brake operation state, etc. of the vehicle 1. Also, the vehicle body 10 may include a front bumper 17 and a radiator grille 18.

In the inside of the vehicle 1, at least one vehicle controller 90 may be provided. The vehicle controller 90 may perform electronic control related to operations of the vehicle 1. The vehicle controller 90 may be installed at an arbitrary location inside the vehicle 1 according to a designer's selection.

The vehicle controller 90 may include at least one processor for receiving electrical signals, processing the received electrical signals, and outputting the processed signals.

The at least one processor may be implemented with at least one semiconductor chip and related components. The at least one semiconductor chip and the related components may be mounted on a Printed Circuit Board (PCB) that may be installed in the inside of the vehicle 1.

Figure 2:
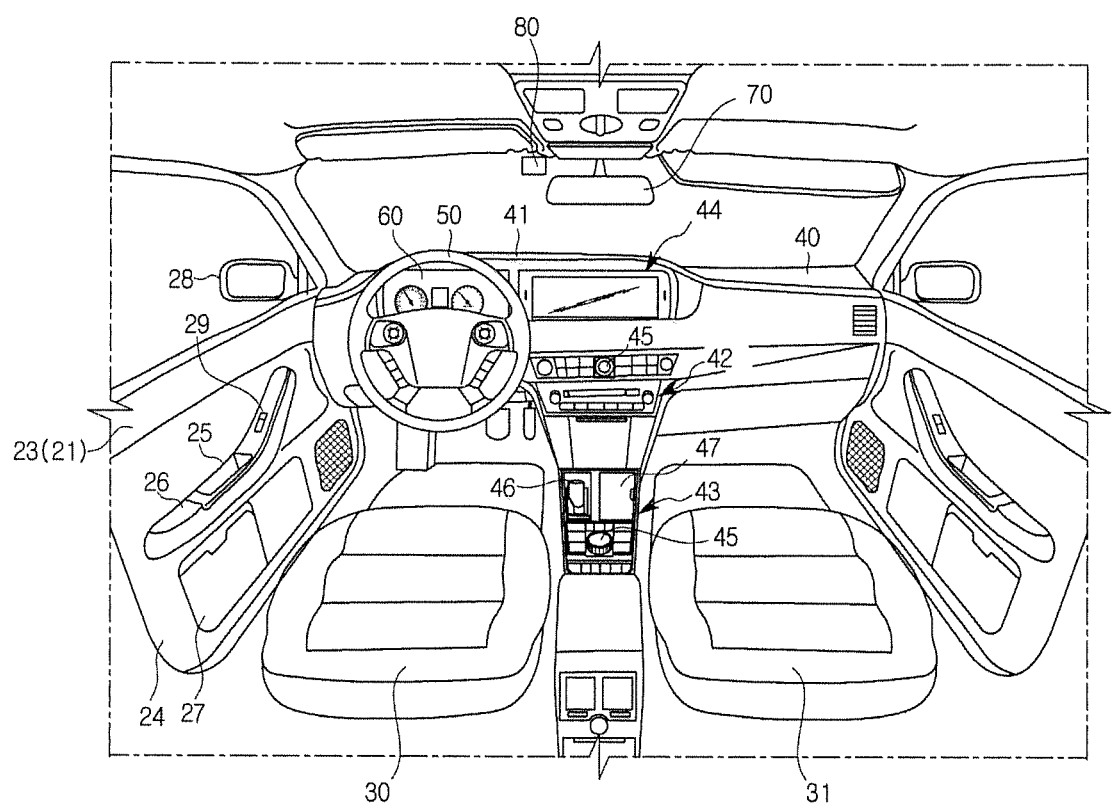
FIG. 2 is a view showing an interior of a vehicle including a head-up display device for a vehicle according to exemplary embodiments of the present disclosure.

FIG. 2 is a view showing an interior of a vehicle including a head-up display device for a vehicle according to exemplary embodiments of the present disclosure. As shown in FIG. 2, a driver's seat 30 and an assistant seat 31 may be provided in the interior of the vehicle 1. A dashboard 40, a steering wheel 50, and an instrument panel 60 may be provided in the interior of the vehicle 1.

The dashboard 40 may refer to an indoor panel which partitions an interior of the vehicle 1 from an engine room (not shown) and in which various components needed for vehicle operations are installed. The dashboard 40 may be provided in front of the driver's seat 30 and the assistant's seat 31. The dashboard 40 may include an upper panel 41, a center fascia 42 and a gear box 43.

A display device 44 for a vehicle may be installed on the upper panel 41 of the dashboard 40. The display device for a vehicle 44 may provide various information to the driver or passenger of the vehicle 1 as an image.

For example, the display device for the vehicle 44 may visually provide various information, such as a map, weather information, news, various moving images or still images, and other information related to the state or operation of the vehicle 1, for example, information about a vehicle HVAC system.

The display device for the vehicle 44 may provide the driver or the passenger a warning according to a degree of risk. Specifically, when the vehicle 1 changes lanes, the display device for the vehicle 44 may provide different warnings depending on a degree of risk to the driver.

The display device for the vehicle 44 may output position information of a speed bump and a warning signal. The display device for the vehicle 44 may be implemented using a navigation device commonly used in vehicles.

The display device for the vehicle 44 may be installed inside a housing integrally formed with the dashboard 40 such that only a display panel is exposed to the outside.

Also, the display device for the vehicle 44 may be installed at the middle or lower portion of the center fascia 42, or may be installed on an upper surface of the dashboard 40 by using a separate support (not shown). In addition, the display device for the vehicle 44 may be installed at various positions that designers may consider.

Various types of devices, such as a processor, a communication device, a satellite navigation device receiving device, and a storage device, may be installed inside the dashboard 40.

The processor installed in the vehicle 1 may be arranged to control various electronic devices installed in the vehicle 1, and may be arranged to perform the functions of the vehicle controller 90 as described above.

The devices described above may be implemented using various components such as a semiconductor chip, a switch, an integrated circuit, a resistor, a volatile or nonvolatile memory or a printed circuit board, etc.

The center fascia 42 may be installed at the center of the dashboard 40, and an input unit 45 may be arranged at the center fascia 42 to input various commands related to the vehicle 1.

The input unit 45 may be implemented using a physical button, a knob, a touch pad, a touch screen, a stick-type operation device and/or a track ball. The driver may control various operations of the vehicle 1 by operating the input unit 45.

The gear box 43 is located at the lower portion of the center fascia 42 and may be arranged between the driver's seat 30 and the assistant seat 31. On the gear box 43, a gear 46, a storage box 47, and various input units 45 may be arranged. The storage box 47 and the input unit 45 may be omitted according to various embodiments.

The steering wheel 50 and the instrument panel 60 may be arranged to face the driver's seat of the dashboard 40. The steering wheel 50 is arranged to be rotated in a predetermined direction in accordance with the operations of the driver, and the vehicle 1 may be steered by a rotation of the wheels 12 of the vehicle 1 in accordance with the rotational direction of the steering wheel 50.

The instrument panel 60 may be arranged to provide the driver of various types of information related to the vehicle 1, such as driving speed, Revolutions Per Minute (RPM), the amount of remaining fuel, the temperature of the engine oil, activation of the turn signal lamp 14, and the traveled distance of the vehicle 1.

The instrument panel 60 may be implemented using an illumination device, a scale plate, etc, and may be implemented using a display panel according to some embodiments.

In a case where the instrument panel 60 is implemented using the display panel, the instrument panel 60 may provide various information such as fuel consumption or whether or not various functions mounted on the vehicle 1 are performed, etc, in addition to the above-described information.

A room mirror 70 may be arranged at an upper portion of the interior of the vehicle 1, and the driver may view the interior or the rear of the vehicle 1 by the room mirror 70.

At least one photographing unit 80 may be arranged in the interior of the vehicle 1. The photographing unit 80 may photograph a surrounding image of the vehicle 1 while the vehicle 1 is running or stopping, and may acquire positional information of a preceding vehicle located in front of the vehicle 1.

The photographing unit 80 may include at least one camera, and may include a three-dimensional space recognition sensor, a radar sensor, and an ultrasonic sensor, etc to photograph a more accurate image.

Although the photographing unit 80 is shown as disposed around the room mirror 70 in FIG. 2, the location where the photographing unit 80 is disposed is not limited, and may be mounted anywhere within the limits of being placed to obtain image information of the inside or outside of the vehicle 1.

The doors 20 may be disposed at both sides of a vehicle 1 to allow an access to an inside space of the vehicle 1. The door 20 may include the door panel 21 forming an exterior of the vehicle 1 and a door trim 24 mounted at an inside of the door panel 21.

The door panel 21 may be a plate formed of metal or plastic to form the doors 20. The door panel 21 may include the door outer panel 22 forming the exterior of the vehicle 1 and a door inner panel 23 arranged opposite the door outer panel 22 while facing the interior of the vehicle 1.

The door trim 24, which is a built-in interior decoration, may be coupled with the interior of the door inner panel 23. The door trim 24 may have functions of sound insulation, sound absorption, and passenger protection when a crash occurs, as well as interior decoration.

An inside handle (not shown) configured to open the doors 20 and a pull handle 25 configured to pull and close the doors 20 may be arranged on the inner side of the door trim 24. In addition, an arm rest 26 and a door pocket 27 may be arranged at the door trim 24.

The side windows 16*c*, a side mirror 28 to watch the rear, and a door locking device (not shown) configured to lock or unlock the doors 20 may be arranged at the doors 20.

Various switches 29 such as a window opening and closing switch, a door locking and unlocking switch, and a side mirror control switch may be arranged at the door trim 24.

In addition, various switches such as a trunk opening switch and a seat control switch as well as various devices mounted on the doors 20 may be additionally arranged at the door trim 24.

A garnish (not shown), a molding, etc. may be attached to an external surface of the door panel 21 for making the exterior elegant, reinforcing a strength of the door panel 21, or enhancing user convenience. In addition, a garnish (not shown), a molding, etc. may be attached to the door trim 24 for interior decoration of the vehicle 1.

A garnish (not shown) refers to various ornaments attached to the vehicle body 10 and serves to protect an external surface and reinforce strength of the vehicle body 10 as well as decoration of the vehicle body 10.

A molding is also a kind of ornament attached to the vehicle body 10 and mainly refers to members in shapes of stripes in which horizontal, vertical, diagonal, and curved lines are repeated. The molding serves to provide an aesthetic sense on a plain surface of an exterior or interior of the vehicle 1 and visual balance with other parts, by making a surface thereof non-uniform.

In addition, the molding is attached to an edge of the garnish (not shown) to serve as a seam of the garnish (not shown) for hiding the seam or for making the seam appearance elegant.

The garnish (not shown) and the molding are not clearly distinguished. That is, the molding may be classified as a kind of the garnish, and the garnish may be referred to as a name such as the molding.

Figure 3:
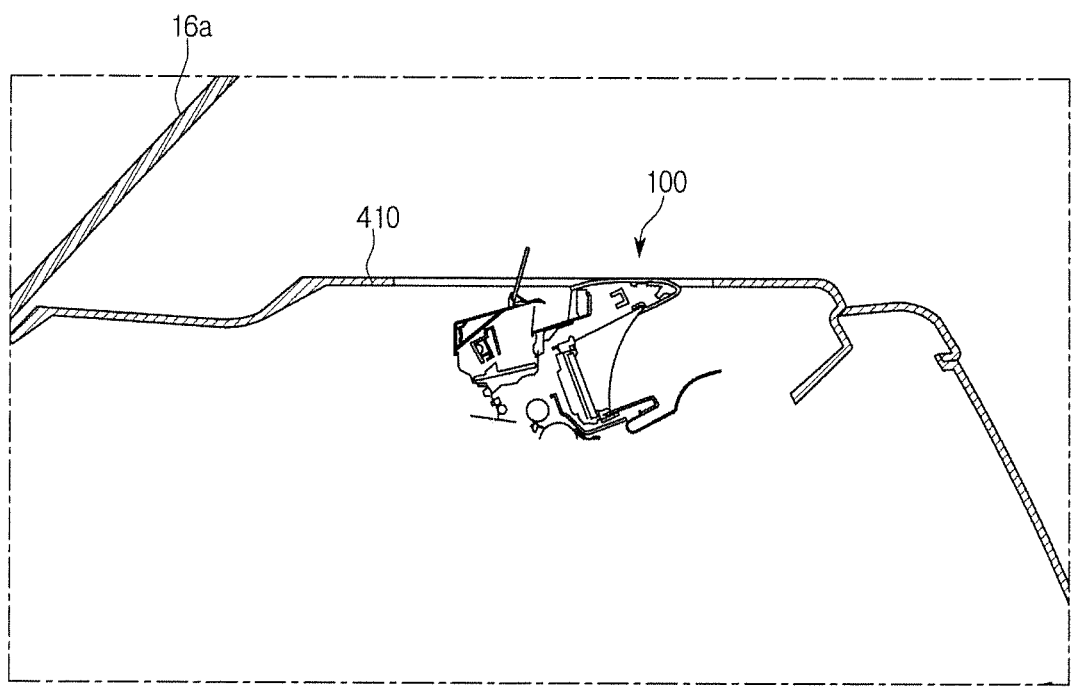
FIG. 3 is a view showing a side section of a dashboard including a head-up display device for a vehicle according to exemplary embodiments of the present disclosure.

FIG. 3 is a view showing a side of a dashboard including a head-up display device for a vehicle according to exemplary embodiments of the present disclosure. As shown in FIG. 3, a head-up display device 100 for vehicle according to the present disclosure may be installed in the vehicle 1.

The head-up display device 100 for a vehicle may be accommodated inside a crash pad 410 and may be arranged to be deployed in the direction of the user's eyes as needed.

The crash pad 410 may form a space therein to accommodate an airbag (not shown) such that when the vehicle 1 collides, the airbag (not shown) may be deployed outside to protect the head or the chest of the occupant.

The crash pad 410 may be referred to as the upper panel 41 forming the upper surface of the dashboard 40. Accordingly, the head-up display device 100 for a vehicle according to the present disclosure may be accommodated inside the upper panel 41 of the dashboard 40.

Generally, the display device 44 for vehicle may be installed on a center fascia located on the front (a surface facing the user) of the dashboard.

However, since various devices need to be installed in the center fascia, an inner space of the center fascia is insufficient to install the display device for a vehicle having a large screen.

In addition, since the change of the sight of the driver increases during vehicle operation when the display device 44 for vehicle is installed in the center fascia 42, a safety problem may be caused. Therefore, in recent years, an installation method in which the display device for a vehicle is embedded on, or in, or attached to the crash pad 410 has been used.

The head-up display device 100 for a vehicle according to the present disclosure may be received between the crash pad 410 and an air conditioning duct (not shown). The air conditioning duct (not shown) may refer to a passage to introduce air into the interior of the vehicle 1 to maintain the interior of the vehicle 1 comfortably.

The air conditioning duct (not shown) is installed on the upper side of a cowl bar (not shown), and a predetermined space may be arranged between the air conditioning duct (not shown) and the crash pad 410.

The head-up display device 100 for a vehicle according to the present disclosure is accommodated in a space between the air conditioning duct (not shown) and the crash pad 410 such that the structure of the existing vehicle may be used as it is and be mostly unchanged, thereby reducing the cost and effort involved in forming a separate space to install the head-up display device 100 for vehicle.

Figure 4:
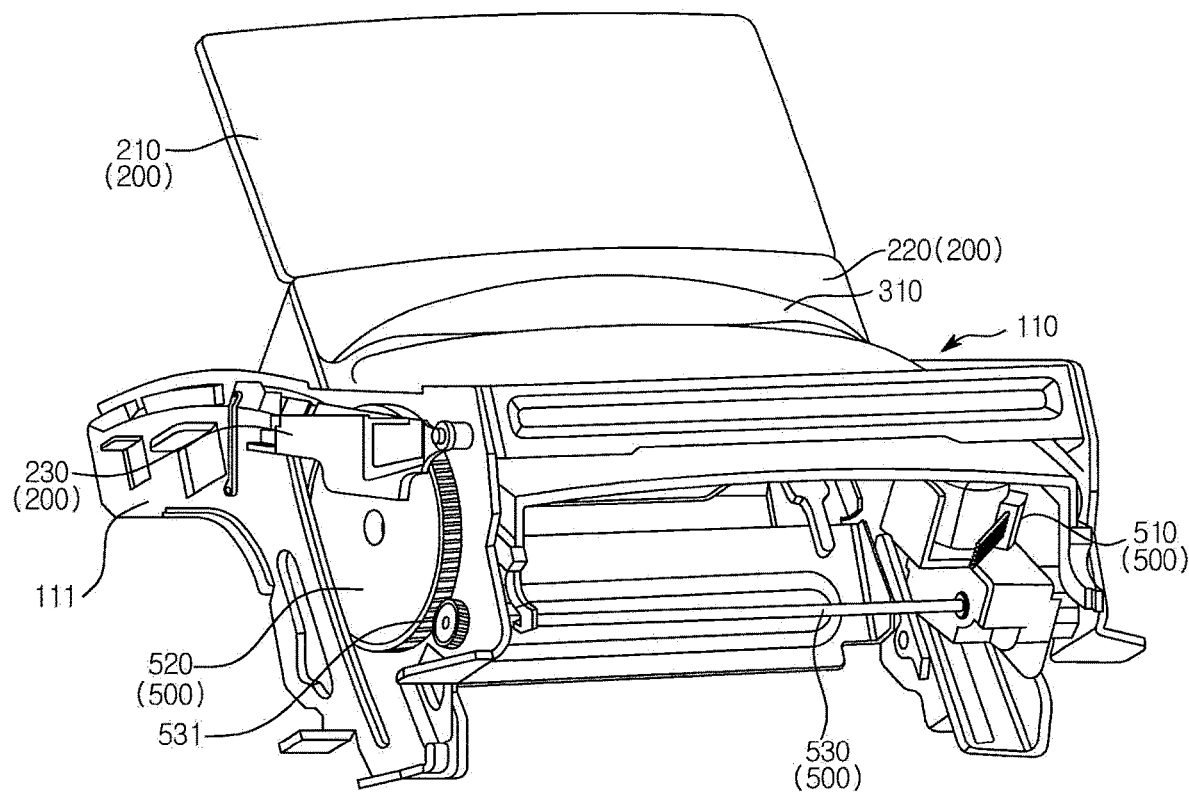
FIG. 4 is a view showing a head-up display device for a vehicle according to exemplary embodiments of the present disclosure.

FIG. 4 is a view showing a head-up display device for a vehicle according to exemplary embodiments of the present disclosure. As shown in FIG. 4, the head-up display device 100 for a vehicle may include a housing 110 including guide plates 111 that form both side surfaces and is mounted on the dashboard 40 of the vehicle 1.

The head-up display device 100 for a vehicle may include a display (not shown) disposed inside the housing 110 and arranged to generate an image and a mirror (not shown) disposed opposite to the display (not shown) and arranged to reflect the image provided by the display (not shown).

The head-up display device 100 for a vehicle may include a combiner device 200 including a combiner 210 arranged to provide an image reflected from the mirror (not shown) to a driver and configured to move up and down from the housing 110, and a shutter device 300 including a shutter 310 disposed to, on or in an upper portion of the housing 110 to open and close the combiner 210 in a sliding manner.

The head-up display device 100 for a vehicle may include an operation device 500 disposed inside the housing 110 to interlock the sliding movement of the shutter 310 and the up and down movements of the combiner device 200.

The housing 110 is inserted into the dashboard 40 of the vehicle 1, and has an inner surface, in which the combiner 210 may move up and down, and has an opening at an upper side thereof such that the combiner 210 may be opened and closed by the shutter 310.

The display (not shown) may be mounted inside the housing 110 to generate an image. However, the display (not shown) may be located on the side or the bottom of the inside of the housing 110 to prevent interference with the up and down movements of the combiner 210.

The display (not shown) may be connected to the vehicle controller 90 and performs, or displays, overall electronic control functions of the vehicle 1, to receive various information related to the vehicle 1, such as the running speed and the engine state of the vehicle 1, and generate an image.

In addition, the display (not shown) may generate various images by receiving various position information related to a moving route to a specific destination when the display (not shown) is connected to a device such as a navigation terminal (not shown).

The mirror (not shown) may refer to a flat mirror that reflects the image provided by the display (not shown) to the combiner 210.

The head-up display device 100 for a vehicle may include the shutter 310 to block light incident through the front window 16a.

Accordingly, the head-up display device for a vehicle 100 according to the present disclosure may solve the problem that the light incident from the front window 16a is reflected from the combiner 210 and obstructs the view of the user, even when the head-up display device for a vehicle 100 is installed on the crash pad 410.

The combiner device 200 may include a combiner holder 220 arranged to fix the combiner 210, and a combiner arm 230 arranged to be rotatable on the guide plate 111 to move the combiner holder 220 up and down.

The operation device 500 may include a motor 510 disposed at a side of the housing 110 to drive the operation device 500, and a cam 520 disposed to each side of the housing 110 to interlock the combiner device 200 and the shutter device 300 by using the motor 510.

The motor 510 may be implemented as a stepper motor and include a reduction gear (not shown).

The operation device 500 may include a shaft 530 disposed to allow the combiner device 200 to be housed inside the housing 110 and to transmit the rotational force of the motor 510 to an opposite of the housing 110, and a shaft gear 531 coupled to both ends of the shaft 530 to interlock the cam 520.

The head-up display device 100 for a vehicle according to the present disclosure may connect the shaft 530 to the shaft gear 531 engaged with the cam 520, rather than directly connecting the shaft 530 to the cam 520 disposed at each side of the guide plate 111.

Therefore, the shaft 530 may avoid interference with the combiner device 200 housed into the housing 110 and the display (not shown) arranged inside the housing 110.

Figure 5:
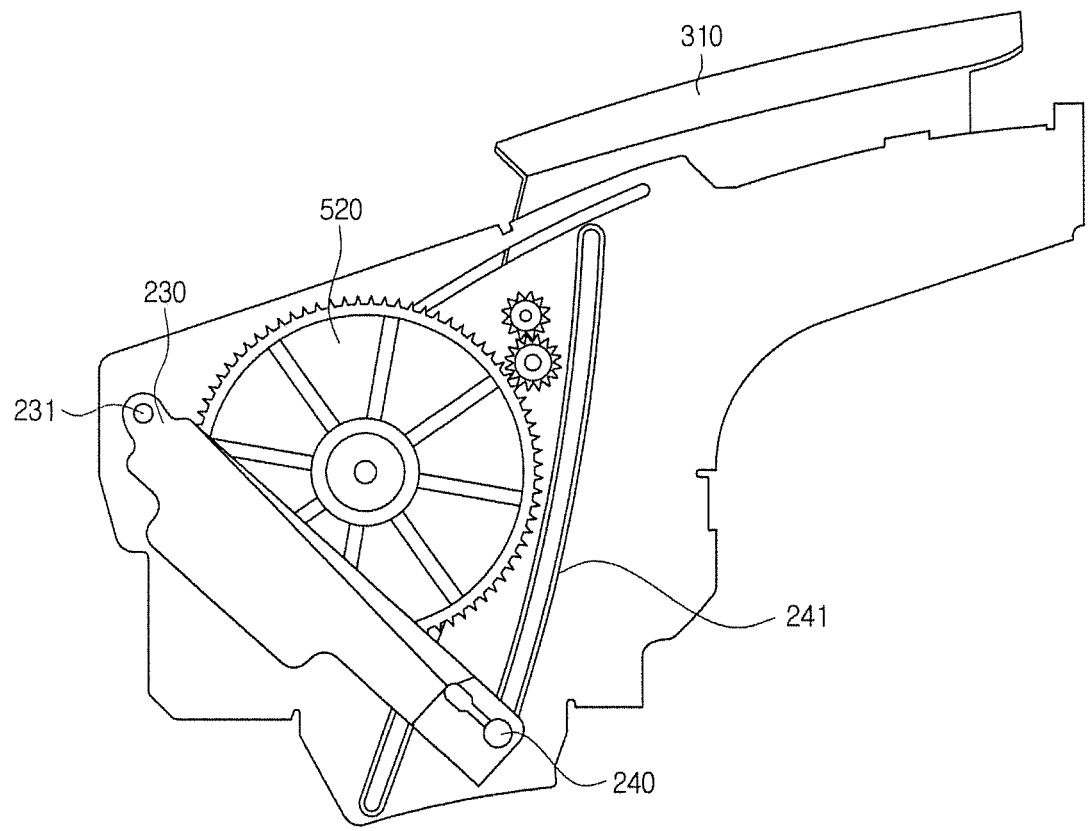
FIG. 5 is a view showing a side of a head-up display device for a vehicle according to exemplary embodiments of the present disclosure.
Figure 6:
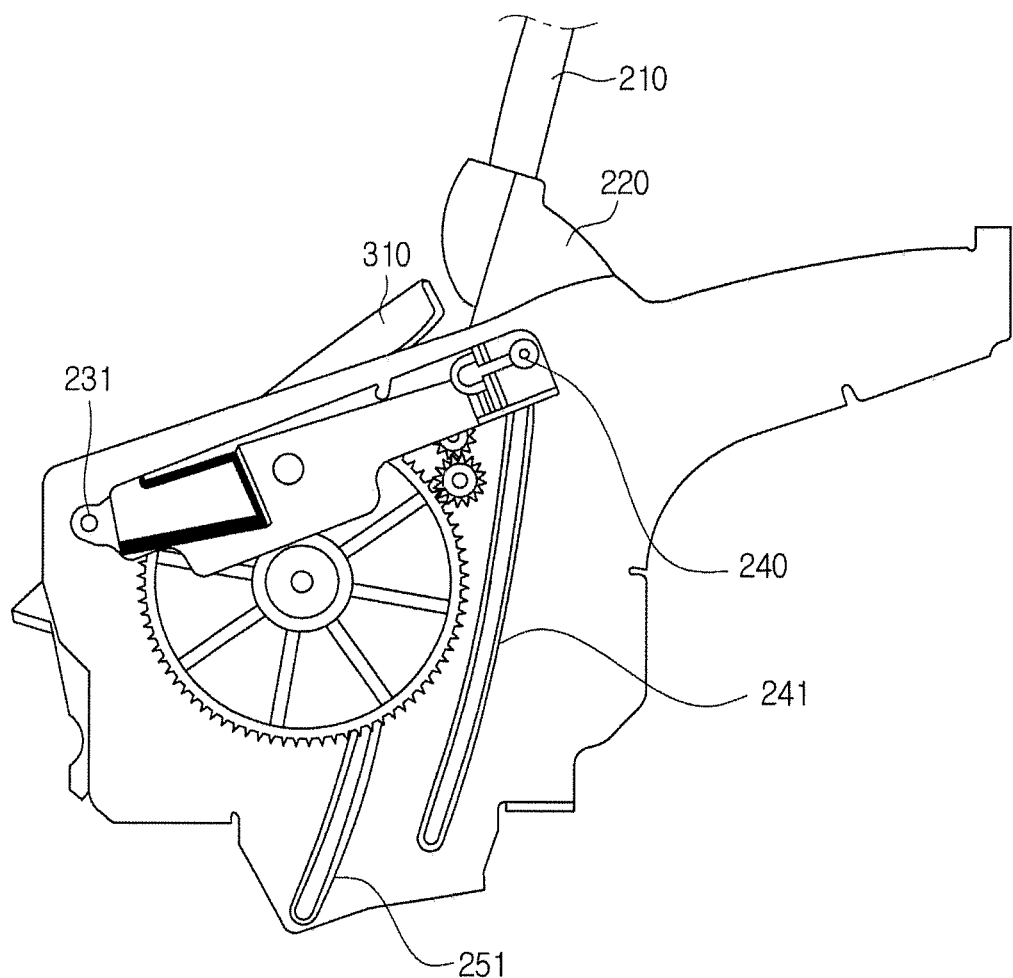
FIG. 6 is a view showing a state in which a combiner is withdrawn in a head-up display device for a vehicle according to exemplary embodiments of the present disclosure.

FIG. 5 is a view showing a side of a head-up display device for a vehicle according to exemplary embodiments of the present disclosure. FIG. 6 is a view showing a state in which a combiner is withdrawn in a head-up display device for a vehicle according to exemplary embodiments of the present disclosure.

As shown in FIG. 5 and FIG. 6, the cam 520 may include a combiner arm operating part (not shown) arranged to adjust the combiner arm 230 so that the combiner arm 230 rotates in conjunction with the rotation of the cam 520.

The combiner device 200 may include a combiner holder link pin 240 protruded from one end of the combiner arm 230, and a combiner holder link pin guide groove 241 arranged in the guide plate 111 to allow the combiner holder link pin 240 to be inserted and guided. In other words, the combiner arm 230 may rotate about a combiner arm rotation axis 231 in conjunction with the rotation of the cam 520.

Also, the combiner holder 220 may move up and down in the vertical direction as the combiner holder link pin 240 arranged on one end of the combiner arm 230 is guided along the combiner holder link pin guide groove 241.

The combiner 210 may be implemented using a spherical lens to improve the focus accuracy of a subject and an irradiated information image of the vehicle 1 may be clearly displayed such that the image may be seen as a virtual image at a predetermined distance in front of the driver's eyes.

Figure 7:
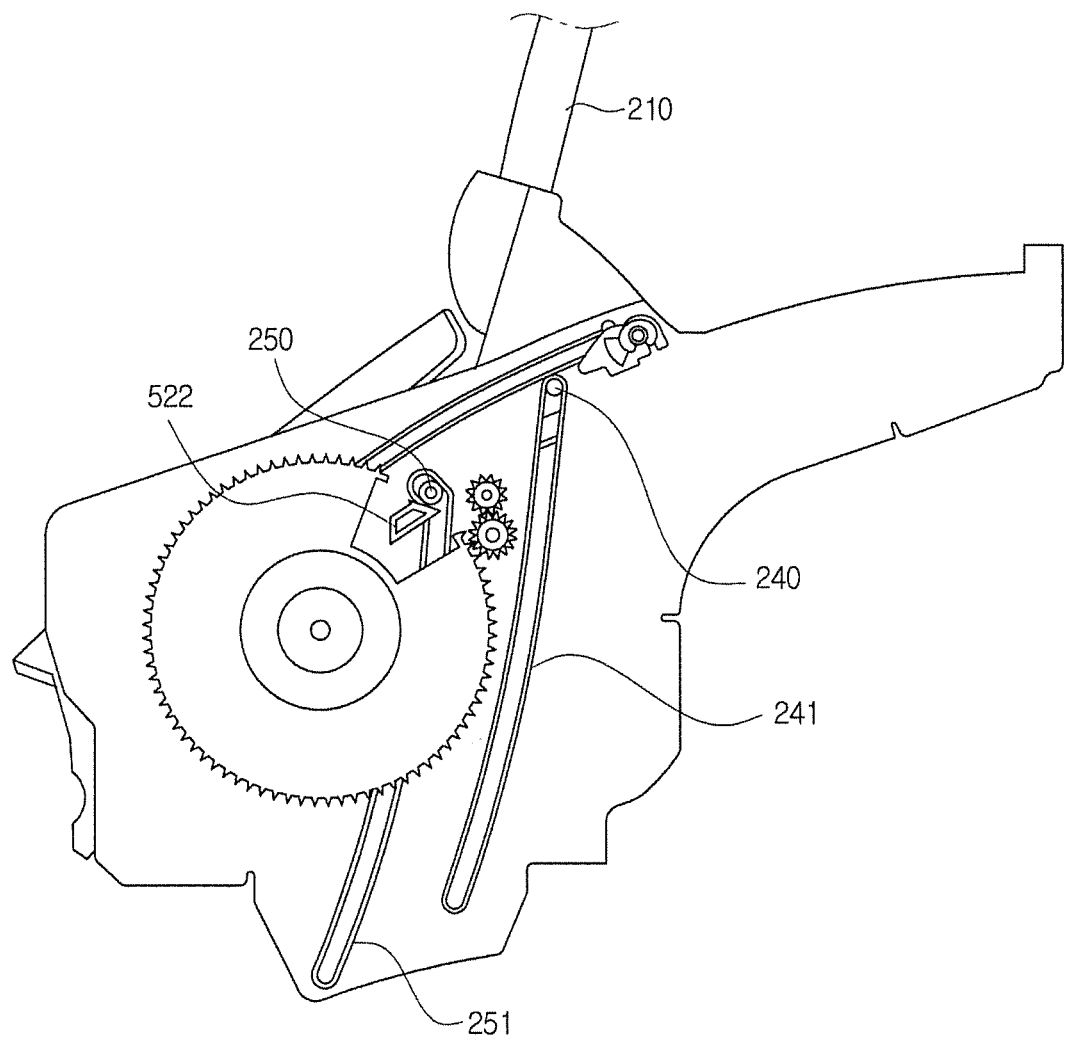
FIG. 7 is a view showing a combiner tilting structure configured to adjust an angle of a combiner in a head-up display device for a vehicle according to exemplary embodiments of the present disclosure.

FIG. 7 is a view showing a combiner tilting structure for adjusting an angle of a combiner in a head-up display device for a vehicle according to exemplary embodiments of the present disclosure.

As shown in FIG. 7, the combiner device 200 may include a combiner tilting pin 250 arranged to adjust the angle of the withdrawn combiner 210 while having the combiner holder link pin 240 as the axis of rotation.

The combiner device 200 may include a combiner tilting pin for adjusting a part 522 arranged inside the cam 520 to adjust the combiner tilting pin 250 by rotation of the cam 520.

The combiner device 200 may include a combiner tilting pin guide groove 251 arranged in the guide plate 111 to allow the combiner tilting pin 250 to be inserted and guided.

In detail, as the combiner tilting pin adjusting part 522 adjusts the combiner tilting pin 250 through the rotation of the cam 520, the angle of the combiner holder 220 including the combiner 210 may be finely adjusted at a zero point of the angle of the combiner 210 drawn by using the combiner holder link pin 240 as the axis of rotation.

Figure 8:
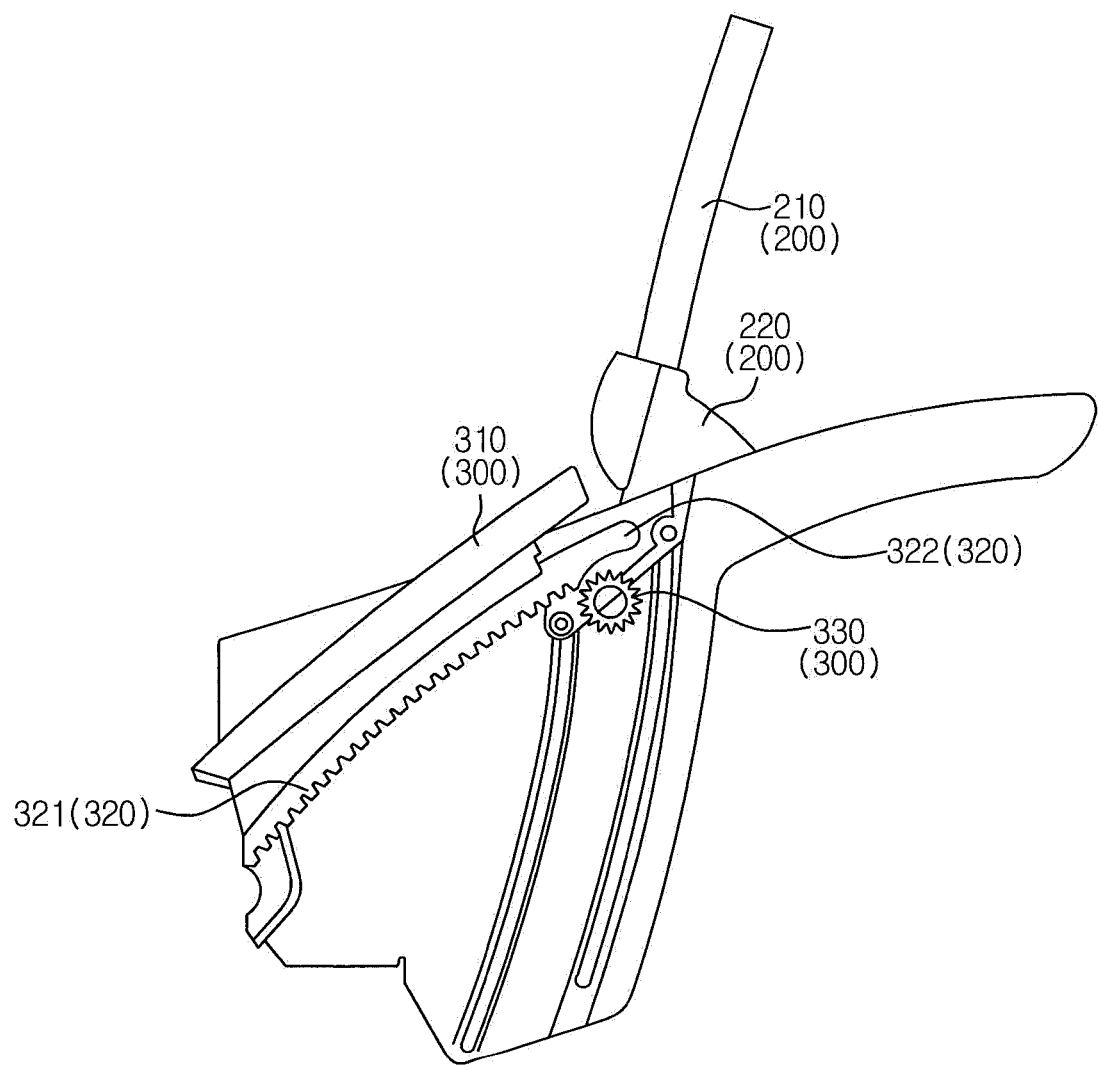
FIG. 8 is a view showing a state in which a shutter is slid in a head-up display device for a vehicle according to exemplary embodiments of the present disclosure.

FIG. 8 is a view showing a state in which a shutter is slid in a head-up display device for a vehicle according to exemplary embodiments of the present disclosure. As shown in FIG. 8, the shutter device 300 may include a shutter moving part 320 disposed at a lower side of the shutter 310 to allow the shutter 310 to be slid.

The shutter device 300 may include a shutter gear 330 engaged with the shutter moving portion 320 to transmit the rotation of the cam 520 to the shutter 310. The rotation of the cam 520 may be transmitted to the shutter gear 330 through a plurality of interlocking gears 112.

The shutter moving part 320 may include a shutter tooth part 321 engaged with the shutter gear 330 and a shutter stopping part 322 extended from the shutter tooth portion 321 and not engaged with the shutter gear 330 so that the shutter 310 is not slid despite the rotation of the shutter gear 330.

Accordingly, the shutter 310 may open and close the combiner 210 by sliding in the forward and backward directions along a curved path in conjunction with the rotation of the cam 520.

Figure 9:
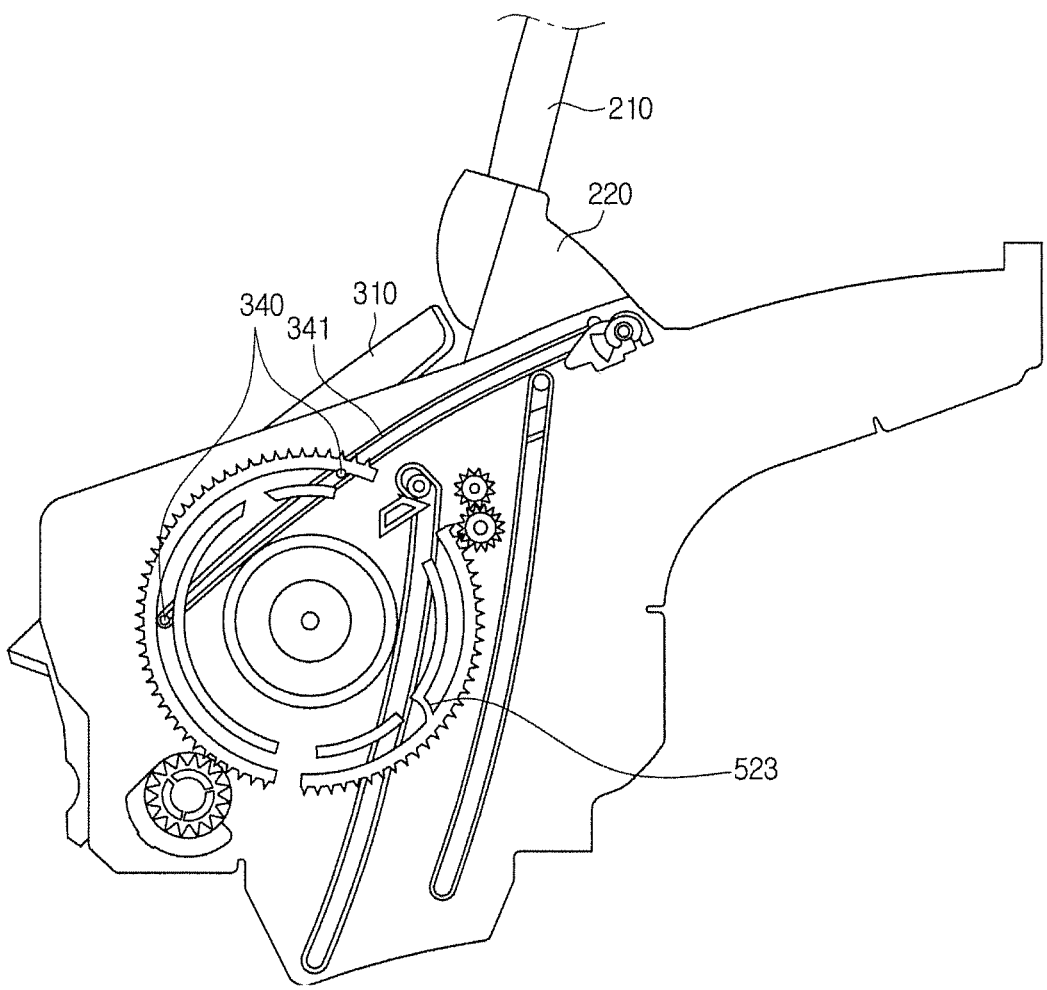
FIG. 9 is a view showing a shutter-moving pin and a shutter-moving pin trigger in a head-up display device for a vehicle according to exemplary embodiments of the present disclosure.

FIG. 9 is a view showing a shutter moving pin and a shutter moving pin trigger in a head-up display device for a vehicle according to exemplary embodiments of the present disclosure. As shown in FIG. 9, the shutter device 300 may include a shutter moving pin 340 arranged to protrude from both sides of the shutter 310, and a shutter moving pin guide groove 341 arranged in the guide plate 111 to allow the shutter moving pin 340 to be inserted and guided.

The shutter 310 is slid by the conjunction of the shutter teeth part 320 and the shutter gear 330, while the shutter moving pin 340 is slid along the shutter moving pin guide groove 341.

The cam 520 may include a shutter moving pin trigger 523 arranged inside the cam 520 and configured to adjust the shutter moving pin 340 so that interference between the up and down movements of the combiner 210 and the sliding of the shutter 310 is prevented.

The shutter 310 is not slid and only the combiner 210 may move up and down while the shutter gear 330 corresponds to the shutter stopping part 322 in spite of the rotation of the shutter gear 330 by the rotation of the cam 520.

When the shutter moving pin trigger 523 interferes with the shutter moving pin 340 by the rotation of the cam 520, the shutter moving part 320 connected to the shutter moving pin 340 moves forward by a predetermined amount so that the shutter tooth part 321 is engaged with the shutter gear 330, thus the shutter 310 may be slid in conjunction with the up and down movements of the combiner 210.

That is, the combiner 210 may be prevented from being interfered with by the shutter 310 by adjusting the engagement of the shutter moving part 320 and the shutter gear 330 by using the shutter moving pin 340 and the shutter moving pin trigger 523.

As such, by allowing the shutter 310 not to be moved when the combiner 210 is not housed over a predetermined distance, and allowing the combiner arm 230 not to be rotated before the shutter 310 is opened over a predetermined distance by using the combiner arm adjusting part (not shown), the timing between withdrawal of the combiner 210 and the sliding of the shutter 310 may be adjusted.

Figure 10:
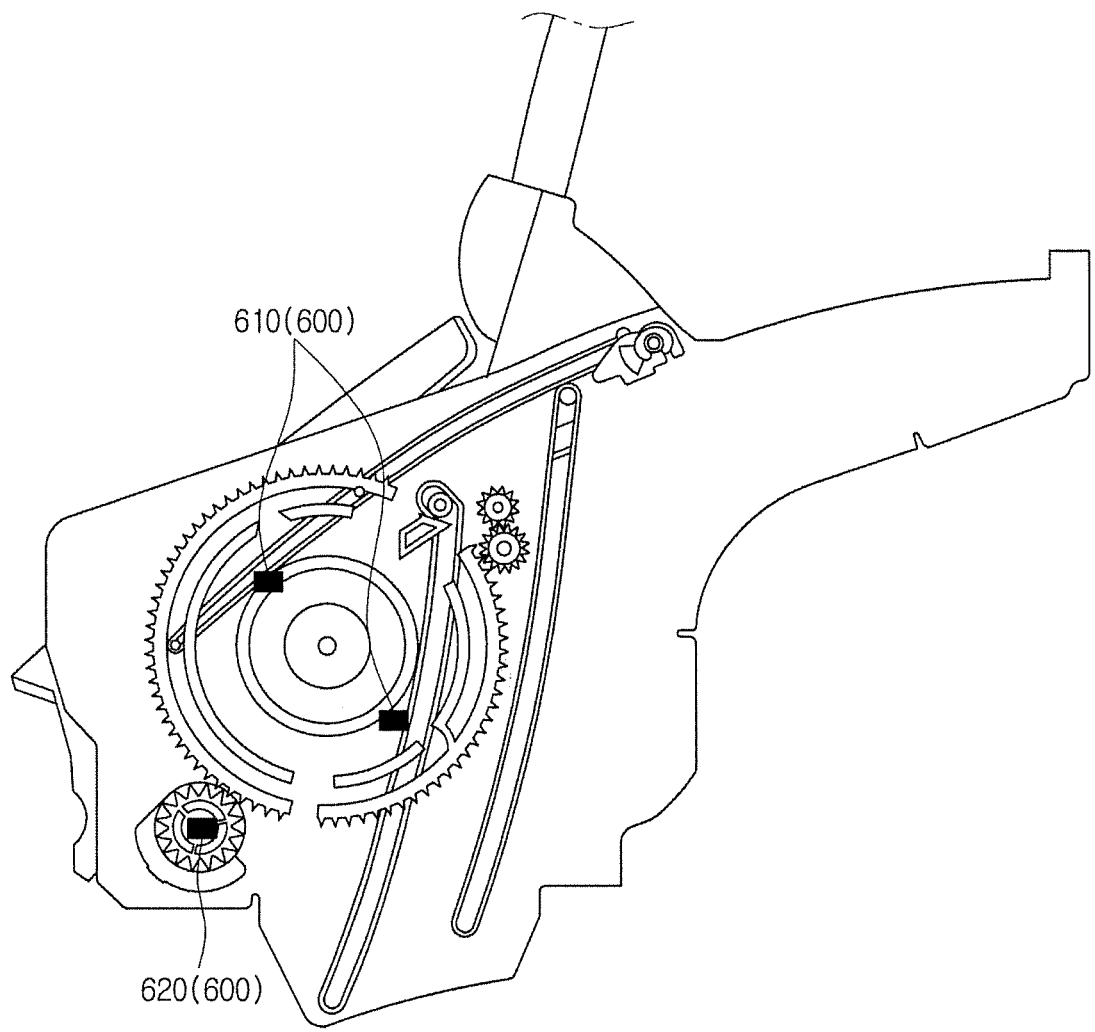
FIG. 10 is a view showing a fail-safe device in a head-up display device for a vehicle according to exemplary embodiments of the present disclosure.

FIG. 10 is a view showing a fail-safe device in a head-up display device for a vehicle according to exemplary embodiments of the present disclosure.

As shown in FIG. 10, the head-up display device 100 for a vehicle may include a fail-safe device 600 arranged inside the housing 110 to prepare for and/or rectify a failure of the head-up display device 100 for a vehicle.

The fail-safe device 600 may include a TACT switch 610 disposed adjacent to the cam 520 to detect a withdrawn position and a zero point of angle of the combiner 210.

The fail-safe device 600 may include a motor rotation detection sensor 620 disposed adjacent to the motor 510 to detect a rotation angle and speed of the motor 510. The present disclosure is not limited thereto, and the number of the TACT switch 610 and the motor rotation detection sensor 620 may be variously provided.

Also, the position of the TACT switch 610 and the motor rotation detection sensor 620 may be variously disposed within the limit that the TACT switch 610 may detect the withdrawal position and the zero point of angle of the combiner 210 and the motor rotation detection sensor 620 may detect the rotation angle and speed of the motor 510.

Figure 11:
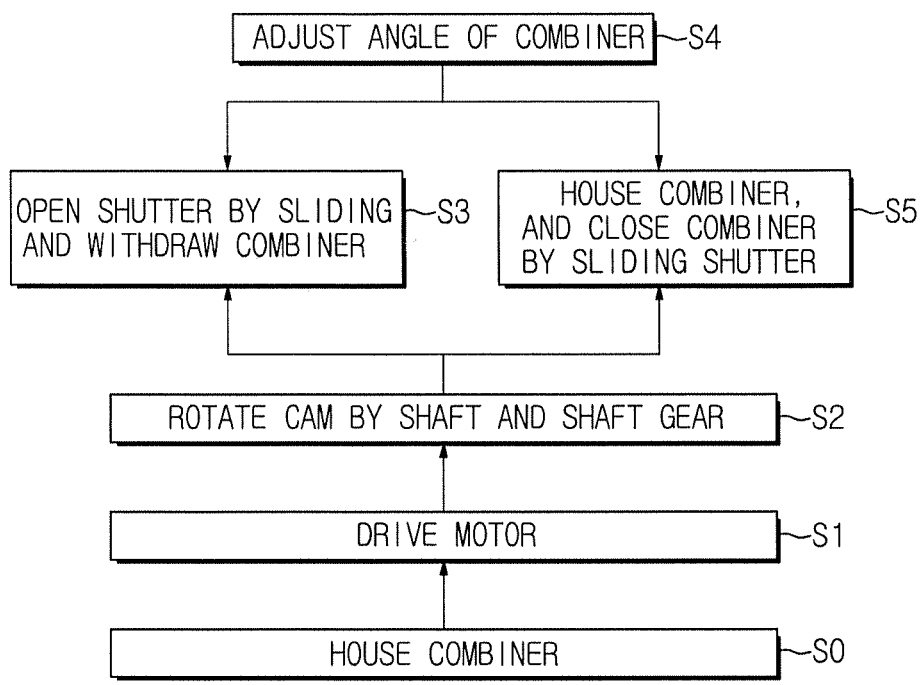
FIG. 11 is a block diagram showing an operational procedure of a control method of a head-up display device for a vehicle according to exemplary embodiments of the present disclosure.

FIG. 11 is a block diagram showing an operational procedure of a control method of a head-up display device for a vehicle according to exemplary embodiments of the present disclosure.

As shown in FIG. 11, a control method of a head-up display device 100 for a vehicle may include, in a state in which the combiner 210 is housed inside the housing 110 (S0), driving the motor 510, arranged inside the guide plate 111 that forms both sides of the housing 110 and withdraws the combiner device 200 (S1).

Then, the rotation of the motor 510 is transmitted to an opposite side of the housing 110 by the shaft 530 arranged inside the housing 110 and the shaft gear 531 connected to both ends of the shaft 530, and the cam 520 disposed at each side of the housing 110 is rotated by the shaft gear 531 (S2).

The shutter 310 disposed at an upper portion of the housing 110 is slid by a rotation of the cam 520 and the combiner 210 is moved up and down from the housing 110 in conjunction with the sliding of the shutter 310 (S3). At this time, the up and down movements of the combiner 210 engaged with the sliding of the shutter 310 may be prevented from interfering with each other.

Accordingly, the shutter moving pin 340 inserted and guided by the shutter moving pin guide groove 341 arranged in the guide plate 111 may be adjusted by using the shutter moving pin trigger 523 arranged inside the cam 520 that is configured to adjust the timing of sliding of the shutter 310.

Then, the combiner tilting pin 250 arranged to protrude from both sides of the combiner holder 220, in which the combiner 210 is accommodated, may be adjusted by using the combiner tilting pin adjusting part 522 arranged inside the cam 520, to adjust the angle of the withdrawn combiner 210 (S4).

Therefore, when the head-up display device 100 for a vehicle according to exemplary embodiments of the present disclosure is to be used, the combiner 210 is moved upward to allow the upper portion of the housing 110 to be protruded such that the user may check the image generated from the display (not shown) without using a separate display device, such as a navigation system.

On the other hand, when the head-up display device 100 for a vehicle is not to be used, the combiner 210 is moved downward and housed inside the housing 110 and the shutter is slid such that the combiner 210 may be (S5) substantially closed.

Figure 12:
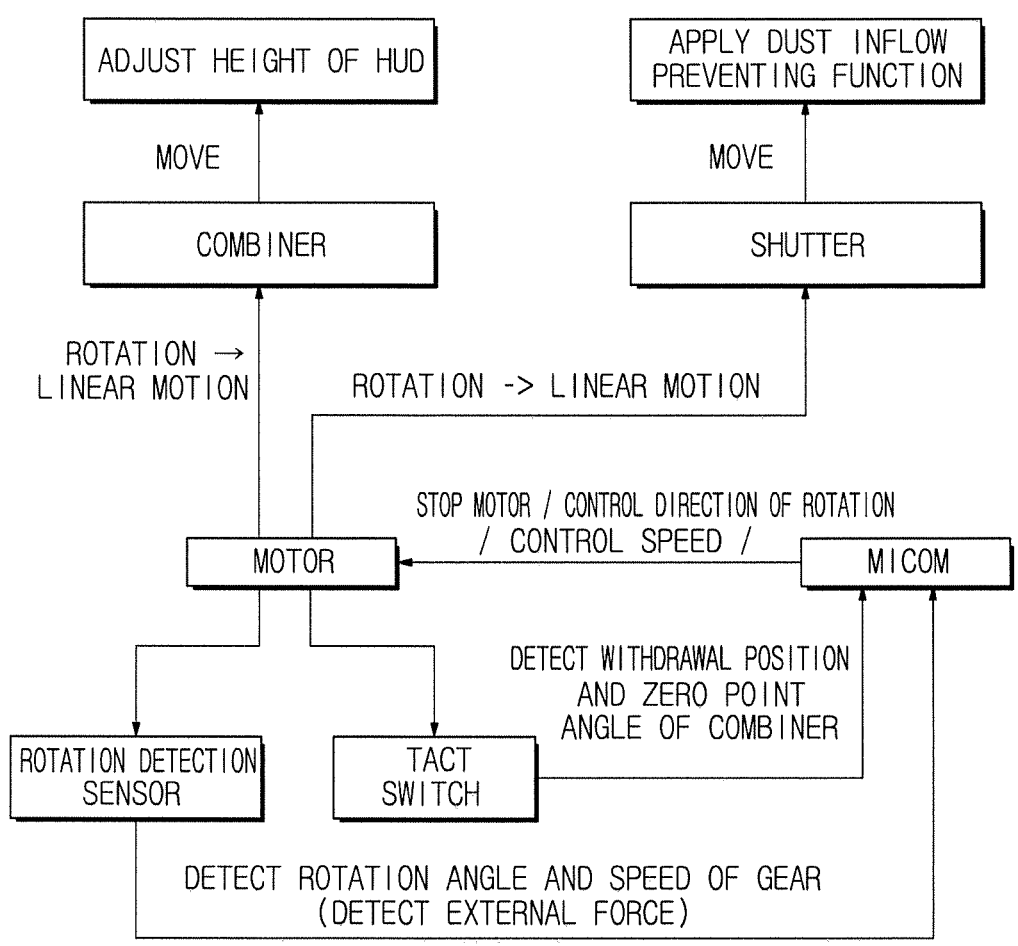
FIG. 12 is a block diagram showing principles of operation of a fail-safe device in a control method of a head-Up display device for a vehicle according to exemplary embodiments of the present disclosure.

FIG. 12 is a block diagram showing principles of operation of a fail-safe device in a control method of a head-up display device for a vehicle according to exemplary embodiments of the present disclosure.

As shown in FIG. 12, the control method of the head-up display device 100 for a vehicle according to exemplary embodiments of the present disclosure may detect the withdrawal position and a zero point of angle of the combiner 210 by the TACT switch 610 disposed adjacent to the cam 520.

The motor rotation detection sensor 620 disposed adjacent to the motor 510 may detect a rotation angle and speed of the motor 510. Therefore, the control method of the head-up display device 100 for a vehicle according to exemplary embodiments of the present disclosure may include preparing for a failure of the head-up display device 100 for a vehicle by using the fail-safe device 600.

Figure 13:
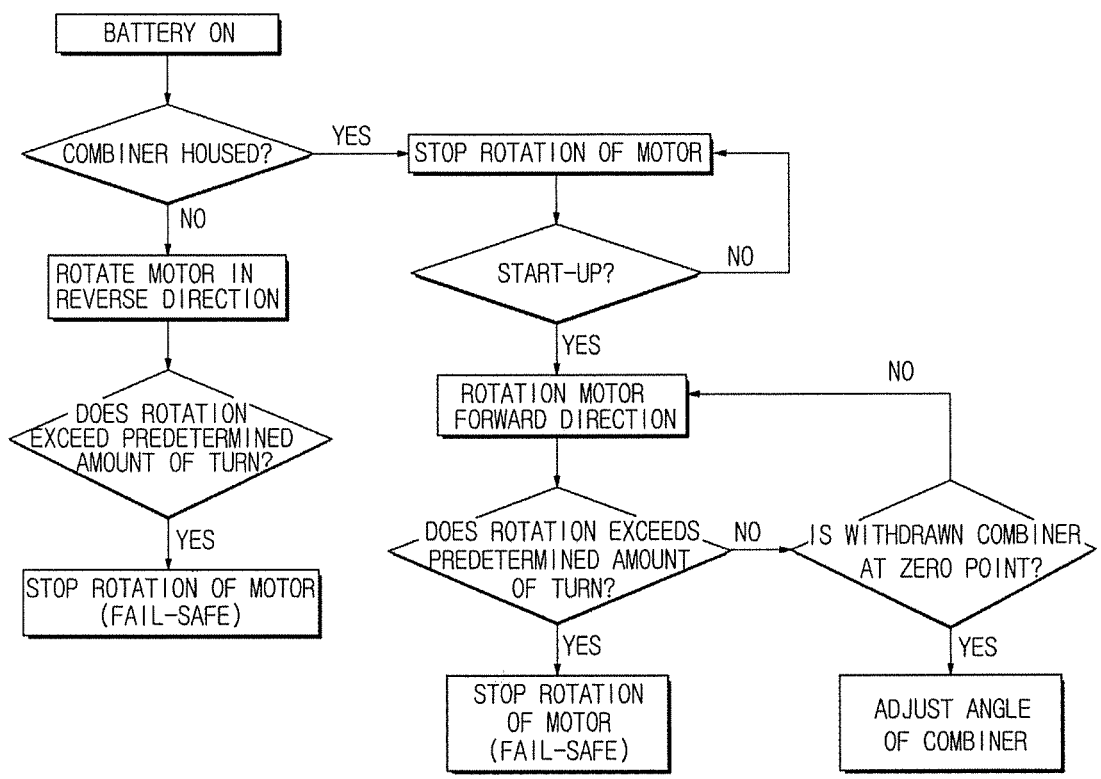
FIG. 13 is a block diagram showing principles of operation of a fail-safe device in a case of a malfunction of a motor in a control method of a head-up display device for a vehicle according to exemplary embodiments of the present disclosure.

FIG. 13 is a block diagram showing principles of operation of a fail-safe device in a case of a malfunction of a motor in a control method of a head-up display device for a vehicle according to exemplary embodiments of the present disclosure.

As shown in FIG. 13, the control method of the head-up display device 100 for a vehicle according to exemplary embodiments of the present disclosure may prepare for, and/or rectify, a failure of the head-up display device 100 for a vehicle.

The control method of the head-up display device 100 for a vehicle according to the present disclosure may include preparing for a malfunction of the motor 510 by forcibly stopping the rotation of the motor when the motor rotates in a forward direction by a predetermined amount or more to withdraw the housed combiner 210, and forcibly stopping the rotation of the motor when the motor rotates in a reverse direction by a predetermined amount or more to house the withdrawn combiner.

Figure 14:
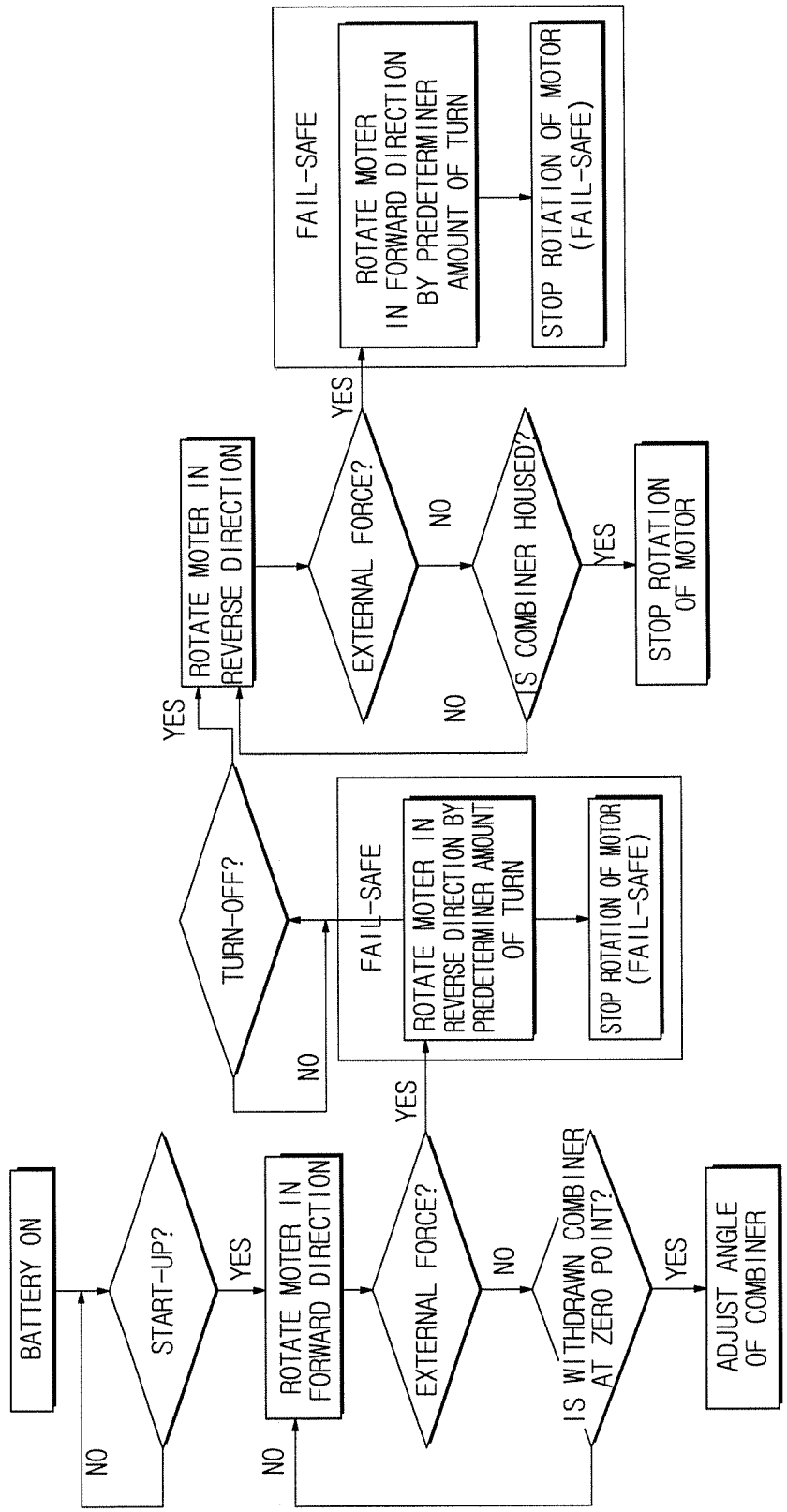
FIG. 14 is a block diagram showing principles of operation of a fail-safe device when an external force acts on a combiner and a shutter in a control method of a head-up display device for a vehicle according to exemplary embodiments of the present disclosure.

FIG. 14 is a block diagram showing principles of operation of a fail-safe device when an external force acts on a combiner and a shutter in a control method of a head-up display device for a vehicle according to exemplary embodiments of the present disclosure.

As shown in FIG. 14, the control method of the head-up display device 100 for the vehicle 100 according to the present disclosure may include preparing for a case in which an external force is applied to the combiner 210 and the shutter 310.

The step of preparing for a case in which an external force is generated in the combiner 210 and the shutter 310 may include stopping the rotation of the motor 510 after the motor 510 rotates in the reverse direction by a predetermined amount, when an external force is generated during the forward rotation of the motor 510 to withdraw the housed combiner 210.

The step of preparing for a case in which an external force is generated in the combiner 210 and the shutter 310 may include stopping the rotation of the motor 510 after the motor 510 rotates in the forward direction by a predetermined amount when an external force is generated during the reverse rotation of the motor 510 to house the withdrawn combiner 210.

While the present disclosure has been described in connection with specific embodiments, the scope of the present the disclosure is not limited to the disclosed embodiments. Various other embodiments that may be changed or modified by those skilled in the art without departing from the scope and spirit of the present disclosure defined by the appended claims fall within the scope of the present disclosure.

What is claimed is:

1. A head-up display device for a vehicle, comprising:
   a housing including a guide plate forming first and second surfaces thereof, the housing mounted on a dashboard of a vehicle;
   a combiner device including a combiner for providing an image to a driver, and for moving vertically in opposed first and second directions relative to the housing;
   a shutter device including a shutter disposed on an upper portion of the housing for opening and closing the combiner in a sliding manner; and
   an operation device disposed in the housing for engaging a sliding movement of the shutter with a movement of the combiner device,
   wherein the operation device comprises:
      a motor disposed to a side of the housing for driving the operation device; and
      a cam disposed on both first and second surfaces of the housing to interlock the combiner device with the shutter device by using the motor,
   wherein the shutter device comprises:
      a shutter tooth part disposed at a lower portion of the shutter to allow the shutter to slide;
      a shutter gear engaged with the shutter tooth part to transmit rotation of the cam to the shutter; and
      a shutter moving pin slidably protruding from both sides of the shutter and configured to slide along a shutter moving pin guide groove arranged in the guide plate, and
   wherein the cam comprises a shutter moving pin trigger arranged in the cam for being engaged with the shutter moving pin, the shutter moving pin trigger adjusting a timing of sliding of the shutter to prevent interference of the vertical, or up and down, movement of the combiner and the sliding of the shutter that are engaged with each other.

2. The head-up display device for a vehicle according to claim 1, wherein the operation device comprises:
   a shaft allowing the combiner device to be housed in the housing and for transmitting a rotational force of the motor to an opposite side of the housing; and
   a shaft gear connected to both ends of the shaft to be engaged with the cam so that the shaft gear moves in conjunction with the cam.

3. The head-up display device for a vehicle according to claim 1, wherein the combiner device comprises:
   a combiner holder for fixing the combiner, and
   a combiner arm rotatably disposed on the guide plate for moving the combiner holder vertically in opposed directions.

4. The head-up display device for a vehicle according to claim 3, wherein the cam comprises a combiner arm operating part for adjusting the combiner arm so that the combiner arm rotates in conjunction with the rotation of the cam.

5. The head-up display device for a vehicle according to claim 4, wherein the combiner device comprises:
   a combiner holder link pin protruding from one end of the combiner arm, and
   a combiner holder link pin guide groove arranged on the guide plate to allow the combiner holder link pin to be inserted and guided.

6. The head-up display device for a vehicle according to claim 5, wherein the combiner device comprises:
   a combiner tilting pin for adjusting an angle of a withdrawn combiner, while using the combiner holder link pin as an axis of rotation, and
   a combiner tilting pin adjusting part arranged in the cam to adjust the combiner tilting pin by a rotation of the cam.

7. The head-up display device for a vehicle according to claim 1, further comprising a fail-safe device disposed in the housing for rectifying a failure of the head-up display device.

8. The head-up display device for a vehicle according to claim 7, wherein the fail-safe device comprises a TACT switch disposed near the cam for detecting the withdrawn position and a zero point of angle of the combiner.

9. The head-up display device for a vehicle according to claim 7, wherein the fail-safe device comprises a motor rotation detection sensor disposed adjacent to the motor for detecting a rotation angle and speed of the motor.

10. A method of controlling a head-up display device for a vehicle, the method comprising:
   driving a motor disposed in a guide plate, the guide plate forming first and second surfaces of a housing;
   transmitting a rotation of the motor to an opposite side of the housing through a shaft disposed in the housing and a shaft gear connected to both ends of the shaft;
   rotating a cam disposed at each side of the housing through the shaft gears;
   sliding a shutter disposed on an upper portion of the housing by the rotation of the cam;
   moving a combiner vertically in opposed first and second directions relative to the housing in conjunction with the sliding of the shutter, and
   engaging a shutter moving pin slidably inserted and guided by a shutter moving pin guide groove disposed in the guide plate using a shutter moving pin trigger arranged in the cam, the shutter moving pin trigger adjusting a timing of sliding of the shutter to prevent an interference between the vertical movement of the combiner and the sliding of the shutter which are engaged with each other.

11. The method according to claim 10, further comprising:
   adjusting a combiner tilting pin protruding from both sides of a combiner holder for accommodating the combiner using a combiner tilting pin adjusting part disposed in the cam for adjusting an angle of the withdrawn combiner.

12. The method according to claim 10, further comprising:
   rectifying a failure of the head-up display device using a fail-safe device including a TACT switch disposed adjacent the cam for detecting a withdrawn position and a zero point of an, angle of the combiner and a motor rotation detection sensor disposed adjacent to the motor for detecting a rotation angle and speed of the motor.

13. The method according to claim 12, wherein the step of rectifying the failure of the head-up display device comprises preparing for a malfunction of the motor including:
   forcibly stopping the rotation of the motor when the motor rotates in a forward direction by a predetermined amount or more to withdraw the housed combiner, and
   forcibly stopping the rotation of the motor when the motor rotates in a reverse direction by a predetermined amount or more to house the withdrawn combiner.

14. The method according to claim 12, wherein the step of rectifying the failure of the head-up display device comprises preparing for a case in which an external force is applied to the combiner and the shutter including:
   stopping the rotation of the motor after the motor rotates in the reverse direction by a predetermined amount, when an external force is generated during the forward rotation of the motor to withdraw the housed combiner, and
   stopping the rotation of the motor after the motor rotates in the forward direction by a predetermined amount when an external force is generated during the reverse rotation of the motor to house the withdrawn combiner.

* * * * *